United States Patent
Ofoche

(10) Patent No.: US 11,747,254 B2
(45) Date of Patent: Sep. 5, 2023

(54) VISCOMETER SYSTEM

(71) Applicant: Abductive Services LLC, Bryan, TX (US)

(72) Inventor: Paul Chike Ofoche, Bryan, TX (US)

( * ) Notice: Subject to any disclaimer, the term of this patent is extended or adjusted under 35 U.S.C. 154(b) by 59 days.

(21) Appl. No.: 17/396,159

(22) Filed: Aug. 6, 2021

(65) Prior Publication Data
US 2022/0107257 A1  Apr. 7, 2022

Related U.S. Application Data

(63) Continuation-in-part of application No. 17/111,034, filed on Dec. 3, 2020, which is a continuation-in-part of application No. 17/063,903, filed on Oct. 6, 2020.

(51) Int. Cl.
*G01N 11/14* (2006.01)
*G01N 9/36* (2006.01)
(Continued)

(52) U.S. Cl.
CPC .............. *G01N 11/14* (2013.01); *G01N 9/36* (2013.01); *G01N 11/08* (2013.01); *G01N 2011/0013* (2013.01)

(58) Field of Classification Search
CPC ........ G01N 11/06; G01N 11/02; G01N 33/26; G01N 33/30; G01N 11/04
See application file for complete search history.

(56) References Cited

U.S. PATENT DOCUMENTS

| | | | | |
|---|---|---|---|---|
| 299,968 | A | * | 6/1884 | Torre ......................... G01S 1/72 342/455 |
| 1,919,921 | A | * | 7/1933 | Anderson ............... G01N 11/04 73/54.13 |

(Continued)

FOREIGN PATENT DOCUMENTS

| | | | |
|---|---|---|---|
| AU | 2014202641 A1 | * | 12/2014 |
| BR | MU8802837 U2 | * | 8/2010 |

(Continued)

OTHER PUBLICATIONS

Introducing the New byko-visc DS Viscometer, Industrial Distribution, Dec. 9, 2016. (Year: 2016).*
Byko-Visc DS Stormer Type Viscometer, Gardco, available on the Internet Archive at <web.archive.org/web/20180825051816/https://gardco.com/pages/viscosity/vi/byko_viscDS.cfm>, Aug. 25, 2018. (Year: 2018).*
"Conversion Between Stormer Viscosity Krebs Units and Viscosity Drain Time", Paul N. Gardner Company, Inc., Jan. 18, 1999. (Year: 1999).*
Wikipedia, Bluetooth. Last edited on Jul. 20, 2021, at 13:37 (UTC).
Wikipedia, Gradient boosting. Last edited on Jul. 20, 2021, at 04:55 (UTC).

(Continued)

*Primary Examiner* — David A. Rogers
(74) *Attorney, Agent, or Firm* — Stonebridge IP, PLLC

(57) ABSTRACT

This disclosure provides a system for measuring rheological properties of a fluid including a vessel with a shape defined by the following proportionality: $x \propto C \ (xy)^{(1/n)}$ wherein the symbol $\propto$ refers to proportionality, and the variables x and y are coordinates on an x-y cartesian coordinate plane, where x is length and y is height; $2 \leq n \leq 4$; and C is a constant with dimensions of length, and the vessel includes a hole at or near the y-coordinate minimum; a temperature sensor and a pressure sensor wherein the temperature sensor and pressure sensor are configured to transmit temperature and pressure information to a mobile display device, tablet, or computer, the mobile display device, tablet, or computer comprising memory and a processor and a software application configured to perform processing operations including accepting two input numerical values including density and viscosity measured by the vessel and outputting industry standard dial readings of a conventional rotational rheometer.

8 Claims, 5 Drawing Sheets

(51) Int. Cl.
*G01N 11/08* (2006.01)
*G01N 11/00* (2006.01)

(56) References Cited

U.S. PATENT DOCUMENTS

| | | | | |
|---|---|---|---|---|
| 2,092,223 A * | 9/1937 | Payne | ................... | G01N 11/06 222/131 |
| 2,131,379 A * | 9/1938 | Lay | ................... | G01N 11/04 73/54.06 |
| 2,141,329 A * | 12/1938 | Zahn | ................... | G01N 11/06 73/54.11 |
| 2,343,030 A * | 2/1944 | Simmons | ................... | G01N 11/02 73/54.13 |
| 2,564,892 A * | 8/1951 | Gerin | ................... | G01N 11/06 73/54.11 |
| 2,625,817 A * | 1/1953 | Oppenauer | ................... | G01N 11/02 73/54.01 |
| 2,743,605 A * | 5/1956 | Gamlen | ................... | G01N 11/06 73/54.11 |
| 2,836,975 A * | 6/1958 | Euverard | ................... | G01N 11/06 73/54.11 |
| 2,934,944 A | 5/1960 | Dave | | |
| 3,064,468 A * | 11/1962 | Muench | ................... | G01N 11/02 73/54.13 |
| 3,074,266 A * | 1/1963 | Sadler | ................... | G01N 11/06 73/54.13 |
| 3,777,551 A * | 12/1973 | Weiss | ................... | G01N 11/14 73/54.28 |
| 4,400,973 A * | 8/1983 | Hegedus | ................... | G01N 11/04 73/54.04 |
| 4,449,394 A * | 5/1984 | Hegedus | ................... | G01N 11/04 73/54.04 |
| 4,662,030 A * | 5/1987 | Cooper | ................... | G01N 11/06 73/224 |
| 5,372,034 A * | 12/1994 | Burke | ................... | G01N 11/04 73/54.13 |
| 6,474,143 B1 * | 11/2002 | Herod | ................... | G01N 11/06 73/32 R |
| 6,705,153 B2 | 3/2004 | Herod | ................... | G01N 11/06 73/32 R |
| 7,190,639 B2 * | 3/2007 | Larson | ................... | G01N 11/06 73/54.13 |
| 7,461,542 B2 | 12/2008 | Weisinger | | |
| 8,024,962 B2 | 9/2011 | Tonmukayakul et al. | | |
| 9,891,152 B2 | 2/2018 | Guo et al. | | |
| 2004/0141183 A1 * | 7/2004 | Larson | ................... | G01N 11/06 356/477 |
| 2011/0120207 A1 | 5/2011 | Gabriel et al. | | |
| 2014/0262516 A1 | 9/2014 | Larson | | |
| 2018/0002995 A1 | 1/2018 | Dotson et al. | | |
| 2018/0356325 A1 | 12/2018 | Cho et al. | | |
| 2019/0323935 A1 | 10/2019 | Elkatatny et al. | | |
| 2021/0072131 A1 | 3/2021 | Ofoche et al. | | |

FOREIGN PATENT DOCUMENTS

| | | | | |
|---|---|---|---|---|
| CN | 203069476 U | * | 7/2013 | |
| CN | 203758873 U | * | 8/2014 | |
| CN | 108760578 A | * | 11/2018 | ............. G01N 11/06 |
| CN | 208297235 U | * | 12/2018 | |
| JP | 59162436 A | * | 9/1984 | |
| JP | 04080638 A | * | 3/1992 | |
| JP | 2009229335 A | * | 10/2009 | |
| JP | 2009229338 A | * | 10/2009 | |
| JP | 2013088166 A | * | 5/2013 | |

OTHER PUBLICATIONS

Wikipedia, Machine learning. Last edited on Jul. 23, 2021, at 19:58 (UTC).
Wikipedia, Pressure measurement. Last edited on Jul. 20, 2021, at 13:52 (UTC).
Wikipedia, Random forest. Last edited on Jul. 12, 2021, at 04:48 (UTC).
Wikipedia, Rheometer. Last edited on Sep. 4, 2020, at 22:17 (UTC).
Wikipedia, Temperature measurement. Last edited on Jul. 7, 2021, at 08:58 (UTC).
Wikipedia, Wireless. Last edited on Jul. 14, 2021, at 19:47 (UTC).
PCT International Search Report, international appl. No. PCTUS2020/058691, dated Feb. 2, 2021.
PCT Written Opinion of the International Searching Authority, international appl. No. PCT/US2020/058691, dated Feb. 2, 2021.
PCT International Search Report, international appl. No. PCT/US2022/016982, dated Jun. 22, 2022.
PCT Written Opinion of the International Searching Authority, international appl. No. PCT/US2022/016982, dated Jun. 22, 2022.

\* cited by examiner

VISCOMETER SYSTEM

CROSS REFERENCE TO RELATED APPLICATIONS

This application is a continuation in part of U.S. Ser. No. 17/063,903 filed on Oct. 6, 2020, which is a continuation in part of U.S. Ser. No. 17/111,034 filed on Dec. 3, 2020; with both prior applications herein incorporated by reference in their entireties.

BACKGROUND OF THE DISCLOSURE

Field of the Invention

This disclosure is generally directed to viscometer vessel systems and software.

Description of the Related Art

There is a need to frequently and more easily measure fluid rheological properties accurately without the requirement to run sophisticated laboratory equipment. Current state-of-the-art in rheometer technology makes use of sophisticated laboratory scale equipment which is not readily available or frequently utilized during industry operations and field processes. Currently available technology to measure fluid rheological properties requires time to operate and analyze the rheology measurements which are infrequently obtained. Existing technology is also not capable of reporting rheological readings under different flow conditions. A conventional rotational rheometer must be operated each time to obtain measurements of fluid rheology. Thus, proper monitoring of fluid rheology in a frequent manner is not possible using current state-of-the-art technology.

Thus, there is a need for devices including software that readily plot and display rheological properties graphically under different flow conditions based on simple inputs of fluid density and viscometer funnel drain times that can be measured in the field. This would simplify the monitoring of fluid rheology and help to ensure the proper monitoring and measurement of fluid rheological profiles. It would also address a need to make rheology reports instant and more frequently obtained.

SUMMARY OF THE INVENTION

This disclosure provides a system for measuring rheological properties of a fluid including a vessel with a shape defined by the following proportionality: $x \propto C [\![ xy ]\!]^{((1/n))}$ wherein the symbol $\propto$ refers to proportionality, and the variables x and y are coordinates on an x-y cartesian coordinate plane, where x is length and y is height; $2 \leq n \leq 4$; and C is a constant with dimensions of length, and the vessel includes a hole at or near the y-coordinate minimum; a temperature sensor and a pressure sensor wherein the temperature sensor and pressure sensor are configured to transmit temperature and pressure information to a mobile display device, tablet, or computer, the mobile display device, tablet, or computer comprising memory and a processor and a software application configured to perform processing operations including accepting two input numerical values including density and viscosity measured by the vessel and outputting industry standard dial readings of a conventional rotational rheometer.

Other features and aspects will be apparent from the following detailed description, the drawings, and the claims

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
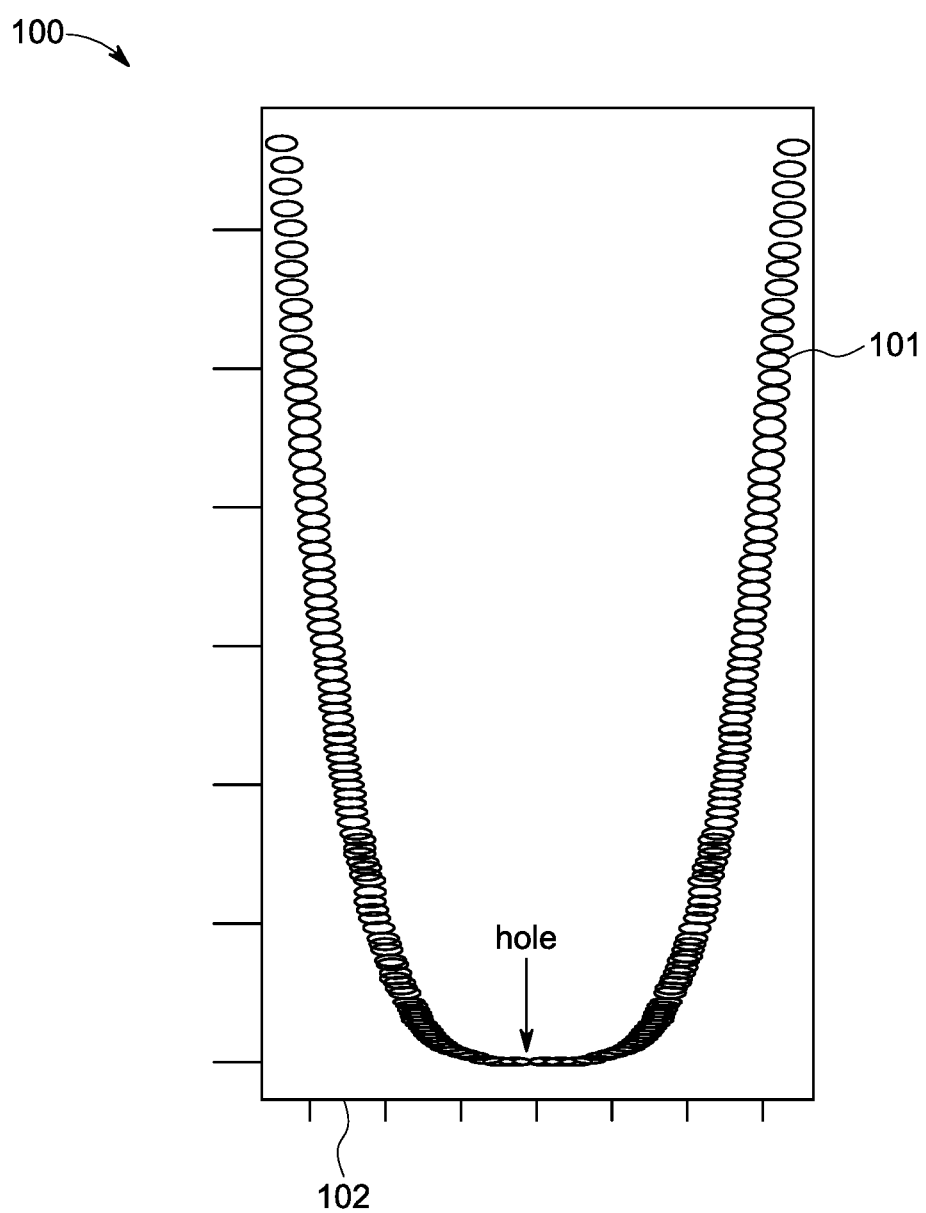
FIG. 1 shows a viscometer vessel 100 of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

Existing technology is not capable of reporting rheological readings under different flow conditions in real time. A conventional rotational rheometer would have to be operated separately each time to obtain measurements of fluid rheology. In embodiments, this invention simplifies the process by making the rheological values readily available based on only two inputs. This can serve as an important resource in operational environments, such as the petroleum industry, food processing industry, cement industry, etc. where frequent monitoring and measurement of fluid rheology is required.

In embodiments, the disclosed goblet/viscometer vessel hinges on a special case of Torricelli's Law, which describes the relationship between the speed of fluid jet outflowing from an opening to the height of the fluid column above the orifice. The disclosed viscometer generalizes the theorem to extend to real fluids of various viscosities which have different coefficients of discharge, accounting for effects of turbulence.

To precisely account for the flow rates and flow profile across a container, it is important to determine a means of decreasing the fluid level at a constant rate.

For the fluid level to decrease at a constant rate, the mathematical representation is:

$$\frac{\text{Change of fluid height}}{\text{Time interval}} = \frac{d(\text{height}_{container})}{d(\text{time})} = \text{constant}_{rate} \quad \text{(Eq.1)}$$

By considering a barrel-shaped or tubular container with a radial cross-section, at any fluid level, the fluid surface area is: $(\pi \times \text{radius}_{container}^2)$.

By applying the concepts of differential calculus, the instantaneous rate of change in fluid volume is:

$$\frac{d(\text{Volume})}{d(\text{time})} = (\text{Fluid surface area}) \times \frac{d(\text{height}_{container})}{d(\text{time})} \quad \text{(Eq.2)}$$

$$= \pi \times (\text{radius}_{container})^2 \times \text{constant}_{rate} \quad \text{(Eq.3)}$$

Adapting Torricelli's law to real fluid applications by introducing a coefficient of discharge, and noting g as the gravitational constant, the instantaneous volumetric rate of flow exit is:

$$\frac{d(\text{Volume})}{d(\text{time})} = \text{Area}_{orifice} \times \text{coefficient}_{discharge} \times \text{velocity} \quad (\text{Eq.4})$$

$$= \text{Area}_{orifice} \times \text{coefficient}_{discharge} \times \sqrt{2 \times g \times \text{height}_{container}} \quad (\text{Eq.5})$$

By equating Eq. 3 and Eq. 5:

$$\text{Area}_{orifice} \times \text{coefficient}_{discharge} \times \sqrt{2 \times g \times \text{height}_{container}} = \pi \times$$

$$(\text{radius}_{container})_2 \times \text{constant}_{rate} \quad (\text{Eq.6})$$

We have that:

$$\text{height}_{container} = \frac{\pi^2 \times (\text{constant}_{rate})^2}{2 \times g \times (\text{Area}_{orifice})^2 \times (\text{coefficient}_{discharge})^2} \times (\text{radius}_{container})^4 \quad (\text{Eq.7})$$

A close inspection of the right-hand side of Eq. 7 reveals that all the terms are either constants or intrinsic fluid properties.

Thus, the proportional relationship between the radius and height of the container is established.

Mathematically:

$$\text{height}_{container} \propto (\text{radius}_{container})^4 \quad (\text{Eq.8})$$

Alternatively:

$$\text{radius}_{container} \propto \sqrt[4]{\text{height}_{container}} \quad (\text{Eq.9})$$

The proportionality sign ($\propto$) in Eq. 9 means that it can be converted into an equation by applying a proportionality constant term, to obtain Eq. 10.

$$\text{radius}_{container} = \text{constant}_{proportionality} \times \sqrt[4]{\text{height}_{container}} \quad (\text{Eq.10})$$

Eq. 10 is applicable to water and a wide range of fluids of low viscosity. To account for fluids of much higher viscosities, the exponential term is varied and would approach Eq. 10a for fluids with very high viscosity (e.g. glycerol).

$$\text{radius}_{container} = \text{Constant}_{proportionality} \times \sqrt{\text{height}_{container}} \quad (\text{Eq.10a})$$

More generally, the Eq. 10b is applied to this invention, where the container radius, proportionality constant, container height and exponential term (n) are variable within the range specified herein.

$$\text{radius}_{container} = \text{constant}_{proportionality} \times (\text{height}_{container})^{\frac{1}{n}} \quad (\text{Eq.10b})$$

where $2 \leq n \leq 4$

This proportionality provides that any fluid placed inside the container and allowed to drain by gravitational force will have the level decreasing at a constant, which provides that the volumetric flow rate has a constant deceleration. Hence, the constant of proportionality can be adjusted as desired to achieve any size, height, or capacity (volume) for a vessel while maintaining the exponential relationship between the container's radius and height, as shown in the drawings.

This feature enables the container or vessel shapes to be adjusted or downsized to smaller volumes for rapidly draining fluids in desired fractions of time to ascertain their flow behavior and enhance real-time, automated, and continuous, measurement of a fluids' physical characteristics, such as rheology, viscosity, and density.

In embodiments, the volume of the disclosed viscometer vessel may be between about 10 $cm^3$ and about 7500 $cm^3$. In embodiments, the volume of the disclosed vessel may be between about 500 $cm^3$ and about 1000 $cm^3$. In embodiments, the volume of the disclosed vessel may be between about 10 $cm^3$ and about 250 $cm^3$. In embodiments, the volume of the disclosed vessel may be between about 1000 $cm^3$ and about 5000 $cm^3$.

In embodiments, the diameter of a hole at the bottom of the vessel may be between about 0.1 cm and 2 cm. In embodiments, the diameter of a hole at the bottom of the vessel may be between about 1 cm and 1.5 cm.

Therefore, the exact volumetric flow rate is known across the entire container and the shear rates at any time and location can be calculated using the formula in Eq. 11 below:

$$\text{Shear Rate}(s^{-1}) = \frac{4 \times (\text{Volumetric Flow Rate})}{\pi \times (\text{radius}_{container})^3} \quad (\text{Eq.11})$$

The exact shear rates so determined can be equated and made to correspond to those obtained from conventional rheometers, thereby reporting the dial readings accordingly. For instance, conventional rheometers used in the petroleum industry report dial readings at these standard shear rates at the corresponding rotational speeds.

When coupled and used in tandem with a weight balance, the density of fluids can also be determined simultaneously in real-time by applying this invention, as is shown in the drawings, whereby mass flow rates and densities are measured simultaneously. The container is filled to a pre-determined volume which has been calibrated with water. In so doing, the densities of any other fluid drained through the container can be determined.

Human error is removed. The same pre-determined volume of fluid simply needs to be placed into the container each time which is then allowed to drain by gravitational force. A single output is recorded which is the drain time used to derive the remainder of the readings.

The disclosed viscometer can be used as a stand-alone device or coupled with associated software to output and display dial readings at all the desired shear rates.

The invention can also be applied to measure the gel strengths (gelation) of fluids by vigorously agitating the fluid sample of pre-determined volume, allowing it to rest at a static condition for a chosen time, and measuring the desired shear rates based on drain time.

The exact shear rates so determined can be equated and made to correspond to those obtained from conventional rheometers or any other desired shear rates, thereby reporting standard dial readings accordingly. For example, conventional rheometers used in the petroleum industry report dial readings at the following standard shear rates at the corresponding rotational speeds.

3 RPM→5.11 s$^{-1}$
6 RPM→10.21 s$^{-1}$
100 RPM→170.23 s$^{-1}$
200 RPM→340.46 s$^{-1}$
300 RPM→510.69 s$^{-1}$
600 RPM→1021.38 s$^{-1}$

The size, height and capacity of the viscometer can be adjusted, while maintaining the proportionality to require less fluid volume for real-time rheology measurement and other purposes, as illustrated in the drawings. The viscometer can be made from any suitable material including plastics, composites, resins, glass, etc., clear, or see-through materials are preferred.

The disclosed viscometer can also be connected to an industrial setting whereby the filling and draining of fluids in the vessel can be automated. The device can be fabricated by various methods known in the art for making, for example, funnel viscometers, and includes but is not limited to 3D printing.

FIG. 1 shows a viscometer vessel 100 of the disclosure. FIG. 1 shows vessel 101 and a cartesian coordinate system 102 which may be used to describe the shape of the vessel.

This invention can be implemented on various hardware, including but not limited to mobile phones and devices, tablets, laptop computers, desktop computers, graphical and visual display units, vehicle computing units in dashboards, etc. The primary output readings obtained are the 3, 6, 100, 200, 300 and 600 RPM (rotations per minute) dial readings (and in centipoise) equivalent to those of a conventional rotational rheometer, plastic viscosity, yield point, and apparent viscosity, as well as a graph showing all these values. Additional values of choice can also be displayed.

The invention uses two input parameters, density and viscometer drain time, and using artificial intelligence techniques, including machine learning and/or neural networks, calculates and outputs conventional rheometer RPM dial readings (and in centipoise). In embodiments, the machine learning techniques include gradient boosting, gradient tree boosting (boosted trees), bootstrap forests, or other like algorithms. See e.g., Machine learning, Wikipedia, the free encyclopedia, last edited 23 Jul. 2021, herein incorporated by reference; Gradient boosting, Wikipedia, the free encyclopedia, last edited 20 Jul. 2021, herein incorporated by reference; and Random forest, Wikipedia, the free encyclopedia, last edited 12 Jul. 2021, herein incorporated by reference.

The invention uses some or all of the following parameters and variables as predictors to arrive at predicted conventional dial readings (and in centipoise) for each RPM: nominal height, wall shear, pressure differential, flow coefficient, mass flow rate, Graham's Law of diffusion (gases), and relative change in viscosity with square root of shear rate. These parameters are further described below.

Nominal height=1, which is the height determined by interpolation at which corresponding shear rates are obtained in a conventional rheometer.

Nominal height uses maximum shear rate=0 s$^{-1}$ and OFI model 900 shear rate at the particular RPM of interest (s$^{-1}$); Maximum shear=77115.77562/l$^3$×Funnel Viscosity.

Funnel/Goblet time (s)=Time for draining 1 quart of fluid from the funnel.

Funnel/Goblet time delta (s)=Difference in time between the duration for draining 1 quart of any fluid and a completely inviscid fluid from the funnel.

Wall shear:

$$\tau_w = \frac{[\rho g(Z) + Z_2]}{\frac{Z}{\cos\alpha\left\{R_L + (R_o - R_L)\frac{Z}{Z_1}\right\}} + \frac{2Z_2}{R_L}}$$

Pressure differential:

$$\Delta P = \Delta P_{cone} + \Delta P_{cylinder} = \frac{\tau_w Z}{\cos\alpha\left\{R_L + (R_o - R_L)\left(\frac{Z}{z_1}\right)\right\}} + \frac{2Z_2}{R_L}$$

Flow coefficient:

$$C_v = Flowrate \times \sqrt{\frac{Specific\ Gravity}{Pressure\ Drop}}$$

Mass Flow Rate:

$$Mass\ Flow\ rate = Density \times \frac{1}{funnel\ time}$$

$$Mass\ flow\ rate = \frac{lb}{gal} \times \frac{qt}{sec} = \frac{lb}{gal} \times \frac{gal}{4 \times sec} = \frac{lb}{sec}$$

$$\frac{Mass}{Time} = \frac{Mass}{Length^3} \times \frac{Length^3}{Time} = \frac{Mass}{Time}$$

Graham's law of diffusion (gases):

$$\frac{rate_1}{rate_2} \propto \sqrt{\frac{density_2}{density_1}}$$

Root density=Square root of density.

Relative change in viscosity with square root of shear rate:

Funnel Viscosity$^2$ ∝ Shear rate.

Figure 2:
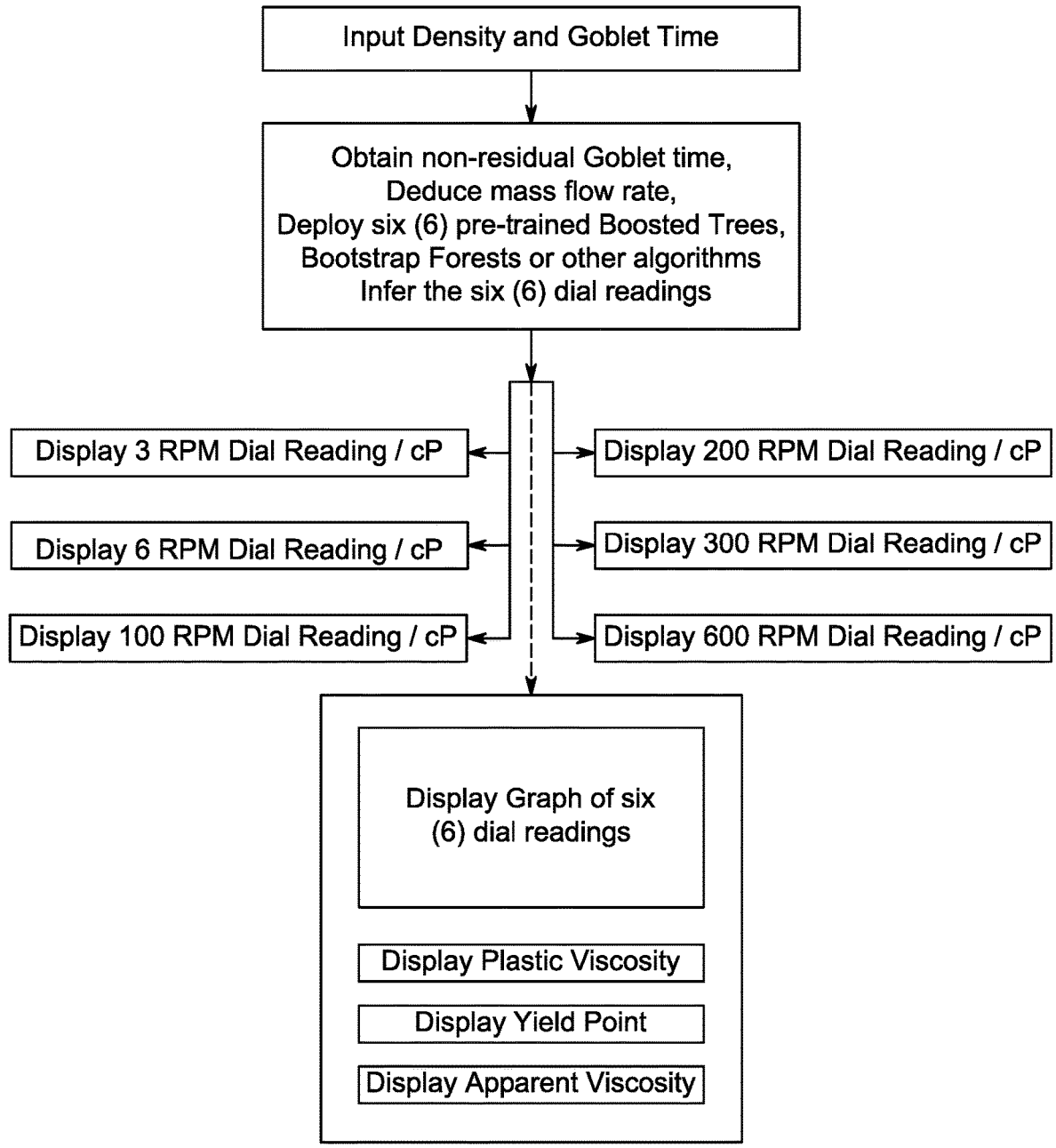
FIG. 2 shows one embodiment of the operation of the software application of the disclosure.

One embodiment of the operation of the software application is shown in FIG. 2. FIG. 2 shows input density and viscometer drain time as input parameters. The output dial readings are obtained as shown. Non-residual drain time is obtained. The mass flow rate is then deduced. Six pre-trained boosted trees are then deployed. Bootstrapped forests or other algorithms then calculate six RPM dial readings (and in centipoise) equivalent to those of a conventional rotational rheometer. Funnel time and density are the only two inputs required.

In embodiments, the invention can be implemented on various devices, such as, a personal computer, a mobile computing device, a notebook computer, a netbook, a mobile multifunction computing device, a personal digital assistant, a tablet computer, a mobile phone, a smart phone, etc.

The invention can thus be implemented in digital electronic circuitry, or in computer hardware, firmware, software, or in one or more combinations. Apparatus of the invention can be implemented in a computer program product tangibly embodied in a machine-readable storage device for execution by a programmable processor; and method steps in the invention can be performed by a programmable processor execution a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include both general and special purpose microprocessors. Generally, a processor will receive instructions and data from a read-only memory and/or a random-access memory. Generally, a computer will include one or more storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and optical disks. Any of the foregoing can be supplemented by, or incorporated in, ASICs (application-specific integrated circuits).

A computer system may include a bus, a processor, a system memory, a read-only memory, a storage device, input devices, and output devices. In some embodiments, the computer system also includes a graphic processing unit.

The bus collectively represents system, peripheral, and chipset buses that support communication among internal devices of the computer system. For instance, the bus communicatively connects the processor with the read-only memory, the system memory, and the storage device.

From these various memory units, the processor (also referred to as a central processing unit or CPU) retrieves instructions to execute and data to process in order to execute the processes of the invention. The read-only-memory (ROM) stores static data and instructions that are needed by the processor and other modules of the computer system.

The storage device, on the other hand, is a read-and-write memory device. This device is a non-volatile memory unit that stores instructions and data even when the computer system is off. Some embodiments of the invention use a mass-storage device (such as a magnetic or optical disk and its corresponding disk drive) as a permanent storage device. The permanent storage device may be a fully solid-state storage, a conventional spinning magnetic pallet storage (i.e. a hard drive), or combinations thereof.

Other embodiments may use a removable storage device (such as a USB flash drive or SD Memory Card) as a temporary storage or as the permanent storage device.

Like the permanent storage device, the system memory is a read and write memory device. However, unlike a storage device, the system memory is a volatile read-and-write memory, such as a random-access memory. The system memory stores at least some of the instructions and data that the processor uses at runtime.

Instructions and/or data needed to perform processes of embodiments of the invention are stored in the system memory, the permanent storage device, the read-only memory, or any combination. For example, the various memory units may contain instructions for processing multimedia items in accordance with some embodiments. From these various memory units, the processor retrieves instructions to execute and data to process to execute the processes of the invention.

The bus also connects to input and output devices. The input devices enable the user to communicate information and select commands to the computer system. The input devices include alphanumeric keyboards, touch panels, and cursor controllers. The input devices also include scanners through which an image can be input to the computer system. The output devices display images generated by the computer system. The output devices may include printers, pen plotters, laser printers, ink-jet plotters, film recorders, and display devices, such as cathode ray tubes (CRT), liquid crystal displays (LCD), OLED's, or electroluminescent displays.

The bus may also connect a computer to a network. In this manner, the computer can be a part of a network of computers (such as a local area network (LAN), a wide area network (WAN), or an Intranet) or a network of networks (such as the Internet). Finally, the computer system in some embodiments also optionally includes a graphics processing unit (GPU). A GPU (also referred to as a visual processing unit or a display processor) is a dedicated graphics rendering device which can manipulate and display computer graphics. The GPU can be included in a video card or can be integrated into the mother board of the computer system along with the processor. Also, the computer system may be used as a personal computer, a workstation, a game console, or the like. Any or all components of the computer system may be used in conjunction with the invention. However, one of ordinary skill in the art will appreciate that other system configurations may also be used in conjunction with the invention.

In preferred embodiments, the invention is implemented on a mobile computing device, for example, a cell phone or smartphone or a tablet computing device. As used herein, a smart phone or tablet computing device refers to a multi-function mobile computing device.

The mobile multi-function device can include the circuitry of a mobile communication device that can perform some or all necessary operations. The mobile multi-function device includes hardware and software components to provide functions including media display functions, a wireless communications function, and various computing functions.

A mobile multi-function device may include a processor that pertains to a microprocessor or controller for controlling the overall operation of the mobile multi-function device. The mobile multi-function device may store media data pertaining to media items in a file system and a cache. In one embodiment, the file system is implemented by a storage disk or a plurality of disks. In another embodiment, the file system is implemented by EEPROM or flash type memory. The file system typically provides high-capacity storage capability for the mobile multi-function device. The mobile multi-function device also may include RAM and Read-Only Memory (ROM). The ROM can store programs, utilities, or processes to be executed in a non-volatile manner. The ROM can be implemented by an EEPROM or Flash type memory to provide writable non-volatile data storage. The RAM provides volatile data storage, such as for a cache.

In one embodiment, to support wireless voice communications, the mobile multi-function device includes a transceiver. The transceiver supports wireless communication with a wireless network (such as a wireless cellular network or Wi-Fi).

The mobile multi-function device may also include a user input device that allows a user of the mobile multi-function device to interact with the mobile multi-function device. For example, the user input device can take a variety of forms, such as a button, keypad, dial, etc. Still further, the mobile multi-function device includes a display (screen display) that can be controlled by the processor to display information to the user. The user input device can also be implemented as a touch-sensitive device or touchscreen apart or integral with the display. A data bus can facilitate data transfer between at least the file system, the cache, and one or more processors.

The mobile multi-function device can also include a bus interface that couples to a data link. The data link can allow the mobile multi-function device to couple to a host device (e.g., host computer or power source). The data link can also provide power to the mobile multi-function device.

The mobile electronic device utilized herein can be a hand-held electronic device. The term hand-held generally means that the electronic device has a form factor that is small enough to be held and carried around in one's hands. In some cases, the hand-held electronic device is sized for placement into a pocket of a user. By being pocket-sized, the user does not have to directly carry the device and therefore the device can be taken almost anywhere the user travels (e.g., the user is not limited by carrying a large, bulky and often heavy device).

The various aspects, features, embodiments, or implementations of the invention described above can be used alone or in various combinations.

The invention is preferably implemented by software and hardware. The invention thus also includes computer readable code on a computer readable medium. The computer readable medium is any data storage device that can store data which can thereafter be read by a computer system. Examples of a computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

As used herein, rheology refers to measurements of the flow of matter, primarily in a liquid or gas state, but also including soft solids or solids under conditions in which they respond with plastic flow rather than deforming elastically in response to an applied force. The liquids referred to herein may be Newtonian or non-Newtonian fluids including muds, emulsions, slurries, or any type of matter that exhibits flow, i.e., after some deformation it flows and is considered to include fluid properties.

As used herein, a rheometer or a conventional rheometer is a laboratory device used to measure the way in which a liquid, suspension, or slurry flows in response to applied forces. It is used for those fluids which cannot be defined by a single value of viscosity and therefore require more parameters to be set and measured than is the case for a viscometer. It measures the rheology of the fluid. Rheometers that control the applied shear stress or shear strain are called rotational or shear rheometers. See Rheometer, Wikipedia, The Free Encyclopedia, date of last revision: 4 Sep. 2020, herein incorporated by reference.

A conventional rotational viscometer may operate at six rotational speeds ranging from 3 to 600 RPM. The rotation speeds may be 3 RPM, 6 RPM, 100 RPM, 200 RPM, 300 RPM, and 600 RPM. Other rotational speeds may also be used as well.

In preferred embodiments the fluid may be a drilling fluid including mud which encompasses fluids encountered in drilling operations, especially fluids that contain significant amounts of suspended solids, emulsified water, or oil. Mud includes all types of water-base, oil-base and synthetic-base drilling fluids.

Dial readings at several rotational speeds (3-600 RPM) or corresponding shear rates which would equivalently be obtained from a conventional 6-speed rheometer may be obtained and displayed. The application additionally displays multiple readings in a graph, thereby making it easy for users to visualize the rheological properties of fluids. Other derivative values for describing fluid rheology, such as yield point, plastic viscosity and apparent viscosity, kinematic viscosity, Saybolt Universal Seconds (SSU), density, Marsh funnel viscosity, gel strength, and temperature may also be reported in a variety of units.

A pressure and temperature transmitter may be installed near to the tip of the vessel. This is utilized for obtaining and reporting the density and temperature respectively of the fluid media instantly. The pressure sensor may also be employed to detect the point at which the vessel is drained empty. This functionality and communication is made possible by use of, for example, Bluetooth™ technology (e.g., Bluetooth™ Low Energy) for transmitting the recordings of pressure values, density, fluid flow time, and temperature into the computer device's machine learning prediction algorithm for analysis and result display. An algorithm functions to obtain the flow duration between the start of drainage and the end of flow, which is fed into the software's machine learning model for inferring results and outputs.

Figure 3:
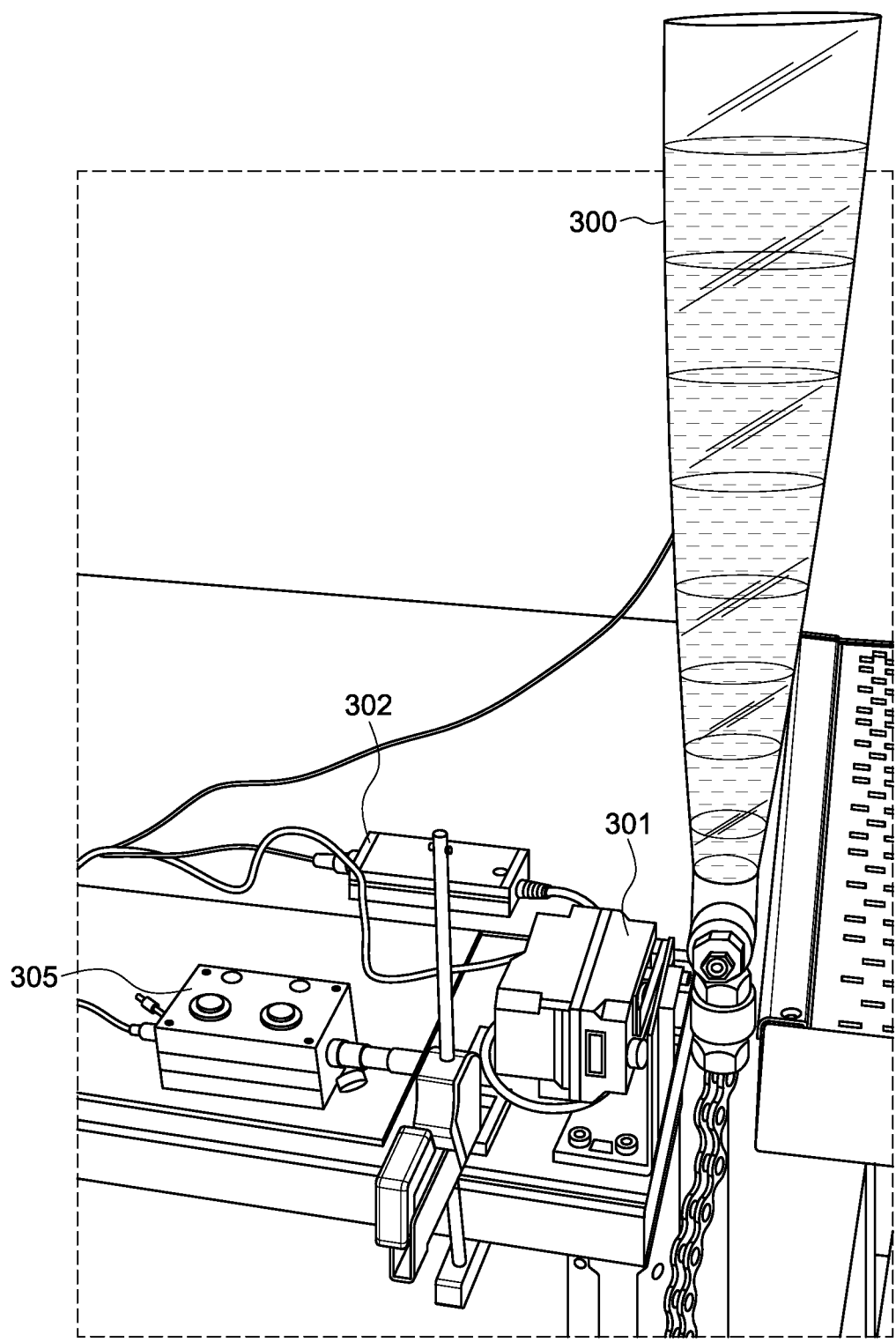
FIG. 3 shows another embodiment of a viscometer vessel system of the disclosure.

FIG. 3 shows another embodiment of a viscometer vessel system of the disclosure. FIG. 3 shows a viscometer vessel 300 with a quick opening valve 301, control box 305, and power supply 302.

Figure 4:
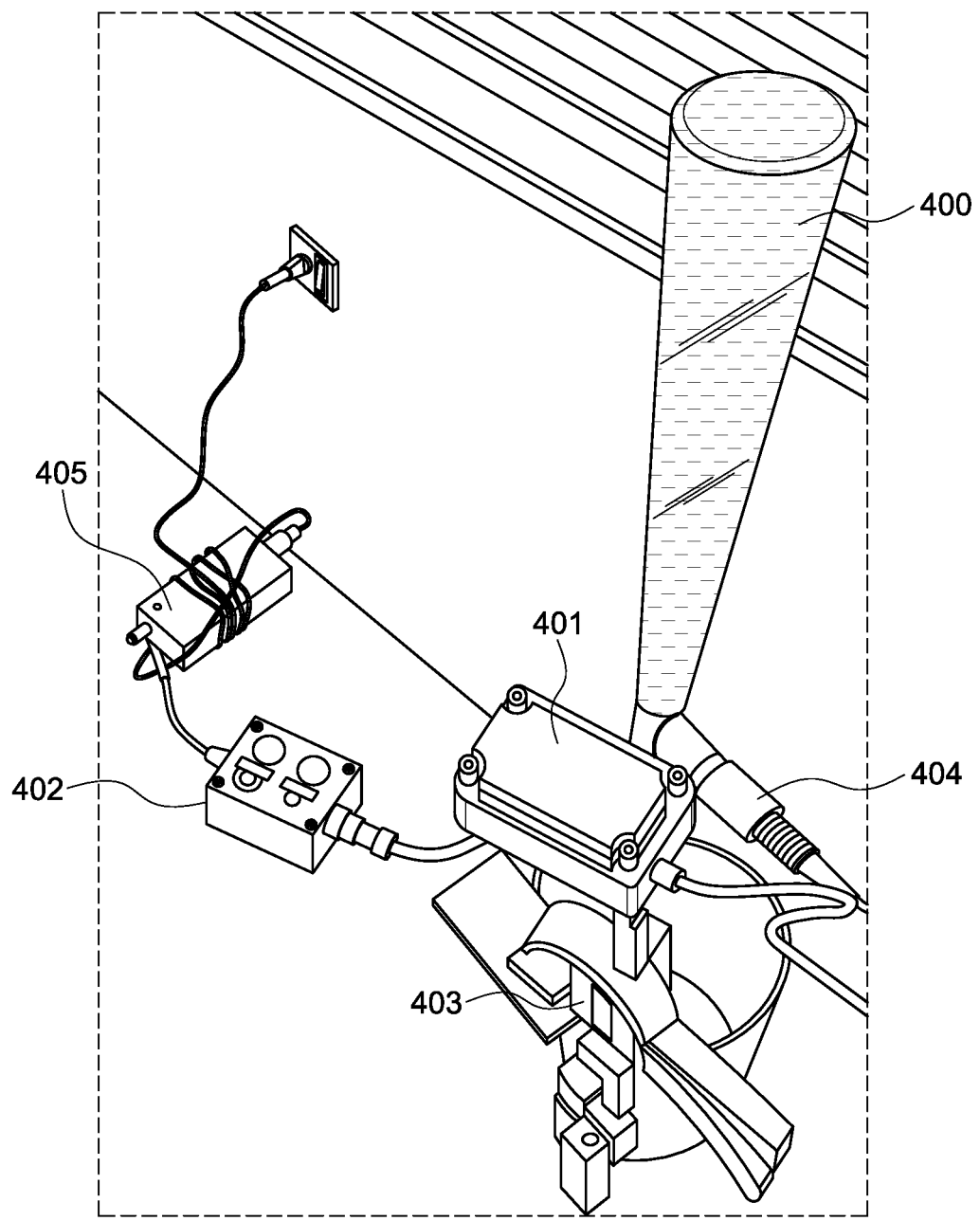
FIG. 4 shows another embodiment of a viscometer vessel system of the disclosure.

FIG. 4 shows another embodiment of a viscometer vessel system of the disclosure. FIG. 4 shows viscometer vessel 400, wireless communication control box 401, power supply 402, pressure and temperature sensors and transmitters 404, and clamp 403.

The disclosure provides a pressure and temperature sensor and/or transmitter for obtaining and reporting the density and temperature respectively of a fluid media instantly. The pressure sensor may also be employed to detect the point at which the vessel is drained empty. An algorithm functions to obtain the flow duration between the start of drainage and the end of flow.

In embodiments, the use of Bluetooth™ technology (e.g., Bluetooth™ Low Energy) for wireless communication instantaneously transmits the recordings of pressure values, density, fluid flow time, and temperature into a device's machine learning prediction algorithm for analysis and result display.

The integration of an electronic fast acting opening/closing valves may be used for either remotely or manually controlling the fluid flow. The use of Modbus protocol and RS-485 technology may be used for data transmission, The ability to instantly measure density, dynamic viscosity, kinematic viscosity, temperature, yield point, plastic viscosity and apparent viscosity, Saybolt Universal Seconds, Marsh funnel viscosity, and gel strength under multiple flow conditions (including 3, 6, 100, 200, 300, and 600 RPM, etc.) or (5.1, 10.2, 170, 340, 511, and 1021 s-1, etc.) is provided.

Density and kinematic viscosity can be measured and reported. Conventional viscometers are unable to measure the density or kinematic viscosities of fluids.

The disclosure provides a device that relies on gravitational force to drive fluid flow and an automated feature to ensure that the operationality is repeatable and eliminates the occurrence of human error.

The reliance of the disclosed device on gravitational force to drive the fluid flow allows the device to be applicable to the measurement of a very wide range of viscosities (e.g., both water and fluids more viscous than honey can be measured) unlike conventional rheometers that require specific torsion springs installed for particular ranges of fluids.

In addition, coupling to a flowline for automatic filling, thereby removing the need for human interaction in this process is provided. Thus, both the draining and filling of the vessel are automated for ease of use and improved accuracy.

In preferred embodiments the fluid may be a drilling fluid including mud which encompasses fluids encountered in drilling operations, especially fluids that contain significant amounts of suspended solids, emulsified water, or oil. Mud includes all types of water-based, oil-based and synthetic-based drilling fluids.

Implementation can be on various hardware platforms, including but not limited to, mobile phones (iOS, Android), tablets (iOS, Android), laptop computers (Windows, Mac), desktop computers (Windows, Mac), graphical and visual display units, dashboards, etc. The primary output readings obtained are the dial readings or dynamic viscosities in centipoise or millipascal-seconds measured at 3, 6, 100, 200, 300 and 600 RPM (equivalent to those of a conventional rotational rheometer), plastic viscosity, yield point and apparent viscosity, as well as a graph showing all these values.

Additional values of choice can also be displayed. Temperature, density, kinematic viscosities readings can be displayed in a variety of units. The vessel's capacity and shape can be varied as required for applications where the use of smaller fluid volumes is desired.

The device, e.g., viscometer, can be made from various materials including, but not limited to plastics, composites, and glass, using different techniques not limited to 3D printing.

Utilization can be in both laboratory and field settings in different industries.

As used herein a temperature sensor is a device used to measure temperature. In embodiments, the temperature sensor may be a thermocouple, thermosistor, resistance temperature detector (RTD), etc. See e.g., Temperature measurement, Wikipedia, the free encyclopedia, last edited on 7 Jul. 2021, herein incorporated by reference.

The temperature sensor may electronically output temperature readings to a wireless transmitter which can wirelessly transmit the temperature measurements to a computing device with the disclosed software for processing. In embodiments, the wireless transmission may be via Bluetooth™. See e.g., Bluetooth, Wikipedia, the free encyclopedia, last edited 20 Jul. 2021, herein incorporated by reference.

As used herein a pressure sensor is a mechanical and/or electronic device used to measure pressure of a liquid. The pressure sensor may be a metal strain gauge, Piezoresistive strain gauge, piezoresistive silicon pressure sensor, or capacitive, magnetic, piezoelectric, optical, potentiometric, or diaphragm design, as well as other appropriate electronic pressure sensors known and used in the art. See Pressure measurement, Wikipedia, the free encyclopedia, last edited: 20 Jul. 2021, herein incorporated by reference.

The pressure sensor may also electronically output pressure readings to a wireless transmitter which can wirelessly transmit the pressure measurements to a computing device with the disclosed software for processing. In embodiments, the wireless transmission may be via Bluetooth™.

Temperature and pressure information generally include temperature and pressure readings measured by the temperature and pressure sensors as well as any other information that is generated by the temperature and pressure sensor systems, e.g., time and date stamps, etc.

'Wireless' as used herein is the transfer of information between two or more points without wires or a solid electrical conductor. Wireless technologies preferably use radio waves. Bluetooth™ is a well-known and preferred implementation. See e.g., Wireless, Wikipedia, the free encyclopedia, last edited: 14 Jul. 2021, herein incorporated by reference.

As used herein, a rheometer or a conventional rheometer is a laboratory device used to measure the way in which a liquid, suspension, or slurry flows in response to applied forces. It is used for those fluids which cannot be defined by a single value of viscosity and therefore require more parameters to be set and measured than is the case for a viscometer. It measures the rheology of the fluid. Rheometers that control the applied shear stress or shear strain are called rotational or shear rheometers. See Rheometer, Wikipedia, The Free Encyclopedia, date of last revision: 4 Sep. 2020.

A conventional rotational viscometer may operate at six rotational speeds ranging from 3 to 600 RPM. The rotation speeds may be 3 RPM, 6 RPM, 100 RPM, 200 RPM, 300 RPM, and 600 RPM. Other rotational speeds may also be used as well.

Heat can be optionally applied to the fluids through various means to control and regulate the temperature at which the viscosity is measured, since temperature has a significant effect on fluid rheology.

Figure 5:
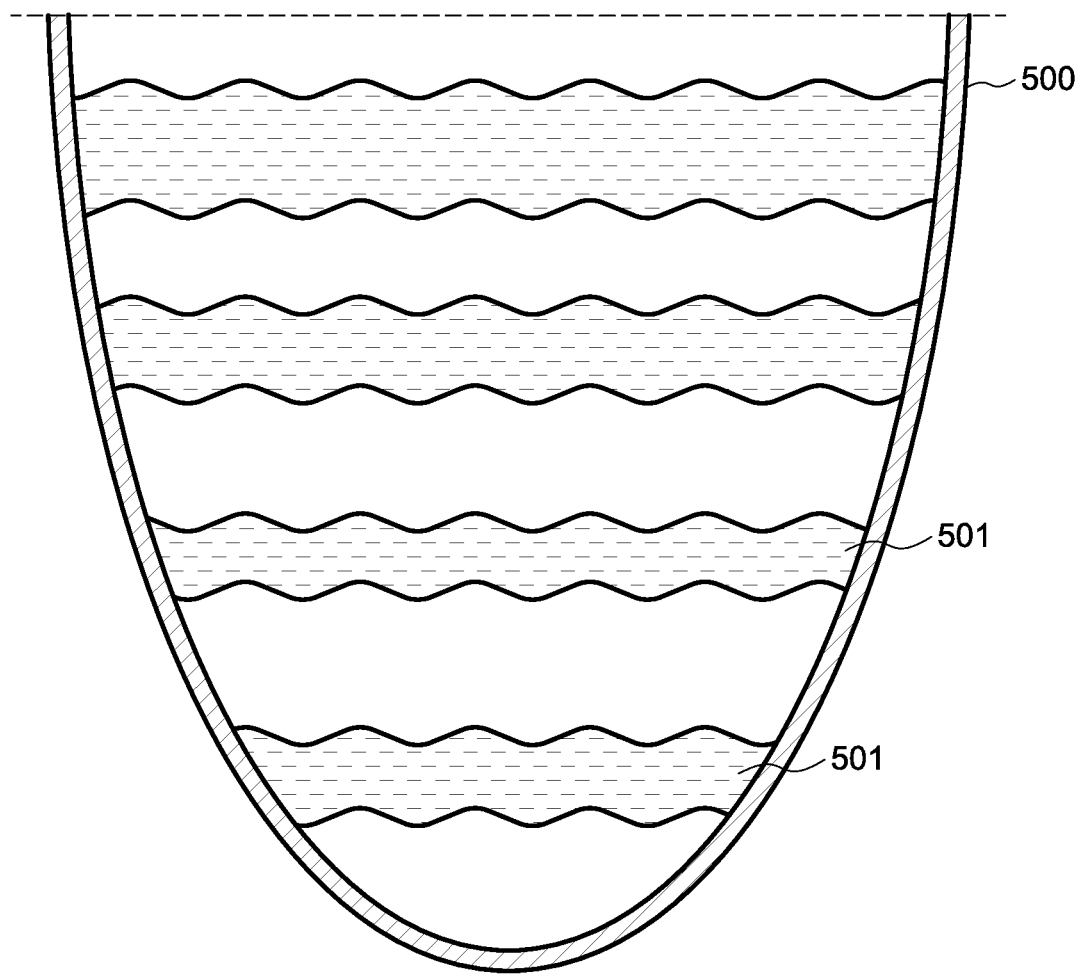
FIG. 5 shows another embodiment of a viscometer vessel of the disclosure.

FIG. 5 shows another embodiment of a viscometer vessel system of the disclosure with wire wounds 501 wrapped around the vessel for supplying heat to the fluid.

While this disclosure includes specific examples, it will be apparent after an understanding of the disclosure of this application has been attained that various changes in form and details may be made in these examples without departing from the spirit and scope of the claims and their equivalents.

The invention claimed is:

1. A system for measuring rheological properties of a fluid comprising
a fluid viscometer with a shape defined by the following proportionality:

$$x \propto C \times y^{\left(\frac{1}{n}\right)}$$

wherein the symbol $\propto$ refers to proportionality, and the variables x and y are coordinates on an x-y cartesian coordinate plane, where x is length and y is height; $2 \leq n \leq 4$; and C is a constant with dimensions of length; and the vessel comprises a hole at or near the y-coordinate minimum;
a mobile display device, tablet, or computer comprising memory and a processor and a software application configured to perform processing operations;

wherein the mobile display device, tablet, or computer receives a volumetric flow rate measured by the fluid viscometer;

the mobile display device, tablet, or computer calculates a shear rate from the volumetric flow rate and the shear rate equates to between 1 and 6 industry standard shear rates of a conventional rotational rheometer;

and the mobile display device, tablet, or computer outputs between 1 and 6 industry standard dial readings of a conventional rotational rheometer.

2. The system of claim 1, wherein the vessel volume ranges from about 10 cm$^3$ to about 7500 cm$^3$.

3. The system of claim 1, wherein the vessel comprises a heater for heating the vessel.

4. The system of claim 1, wherein the volumetric flow rate measured by the fluid viscometer is received by the mobile display device, tablet, or computer by wireless technology.

5. The system of claim 1, wherein 6 industry standard dial readings of a conventional rotational rheometer are outputted.

6. The system of claim 5, wherein the 6 industry standard dial readings correspond to 3 RPM, 6 RPM, 100 RPM, 200 RPM, 300 RPM, and 600 RPM.

7. The system of claim 1, wherein the system further comprises a temperature sensor and a pressure sensor wherein the temperature sensor and pressure sensor are configured to transmit temperature and pressure information to the mobile display device, tablet, or computer; and the mobile display device, tablet, or computer outputs yield point, plastic viscosity, apparent viscosity, kinematic viscosity, Saybolt Universal Seconds density, Marsh funnel viscosity, gel strength, and/or temperature using the industry standard dial readings, the temperature senor, and/or the pressure sensor.

8. The system of claim 7, wherein the temperature sensor and pressure sensor transmit temperature and pressure information to the mobile display device, tablet, or computer by wireless technology.

* * * * *